(12) United States Patent
Fresk et al.

(10) Patent No.: US 6,671,060 B1
(45) Date of Patent: Dec. 30, 2003

(54) IMAGE FORMING SYSTEM AND METHOD OF OPERATING AN IMAGE FORMING SYSTEM

(75) Inventors: J. Sean Fresk, Eagle, ID (US); Dellas G. Frederiksen, Boise, ID (US); Chris R. Gunning, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/181,383

(22) Filed: Oct. 26, 1998

(51) Int. Cl.[7] ............................. G06F 15/00; G06K 1/00
(52) U.S. Cl. .................. 358/1.15; 358/1.1; 358/1.9; 358/505; 358/474; 358/1.13
(58) Field of Search ................................. 358/1.15, 1.1, 358/1.9, 505, 474, 1.13

(56) References Cited

U.S. PATENT DOCUMENTS

| | | | | |
|---|---|---|---|---|
| 5,280,585 A | * | 1/1994 | Kochis et al. | 710/48 |
| 5,684,607 A | | 11/1997 | Matsumoto | 358/442 |
| 5,731,879 A | * | 3/1998 | Maniwa et al. | 358/296 |
| 5,790,640 A | * | 8/1998 | Tassa et al. | 358/1.15 |
| 5,889,597 A | * | 3/1999 | Ara et al. | 358/473 |
| 6,011,940 A | * | 1/2000 | Van Lydegraf | 399/87 |
| 6,067,169 A | * | 5/2000 | Ohnishi | 358/1.9 |
| 6,104,508 A | * | 8/2000 | Miyazaki | 358/474 |
| 6,185,010 B1 | * | 2/2001 | Watanabe | 358/442 |
| 6,216,176 B1 | * | 4/2001 | Kadota | 710/1 |
| 6,313,877 B1 | * | 11/2001 | Anderson | 348/333.05 |
| 6,418,555 B2 | * | 7/2002 | Mohammed | 717/169 |
| 6,498,658 B1 | * | 12/2002 | Sekikawa | 358/1.16 |

FOREIGN PATENT DOCUMENTS

| | | |
|---|---|---|
| EP | 541262 A2 | 5/1993 |
| EP | 719035 A2 | 6/1996 |
| EP | 720343 A2 | 7/1996 |
| JP | 060325137 | 11/1994 |
| JP | 080161127 | 6/1996 |
| JP | 080292892 | 11/1996 |
| JP | 090037014 | 2/1997 |
| JP | 090074454 | 3/1997 |
| JP | 100032663 | 2/1998 |
| JP | 100065881 | 3/1998 |

* cited by examiner

Primary Examiner—Kimberly Williams
Assistant Examiner—Ashanti Ghee

(57) ABSTRACT

The present invention includes an image forming system and method of operating an image forming system. According to one aspect, the present invention provides an image forming system including an accessory device including a processor configured to control at least one operation of the accessory device; an image forming device coupled with the accessory device and including a storage device; and wherein the storage device of the image forming device is configured to store operational data useable by the accessory device, and the image forming device is configured to output the operational data and the accessory device is configured to receive the operational data, and the processor is configured to control the at least one operation of the accessory device responsive to the operational data.

24 Claims, 6 Drawing Sheets

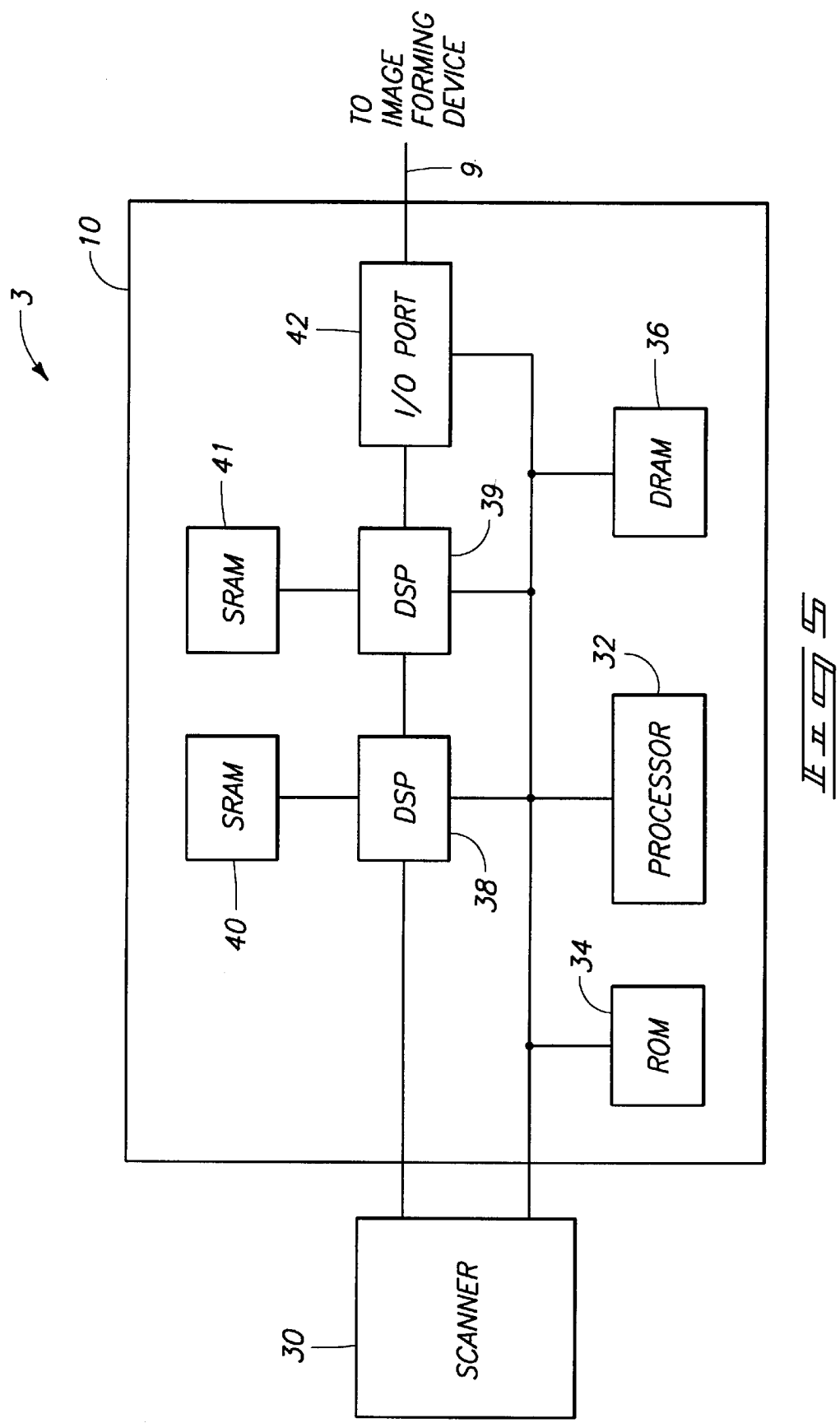

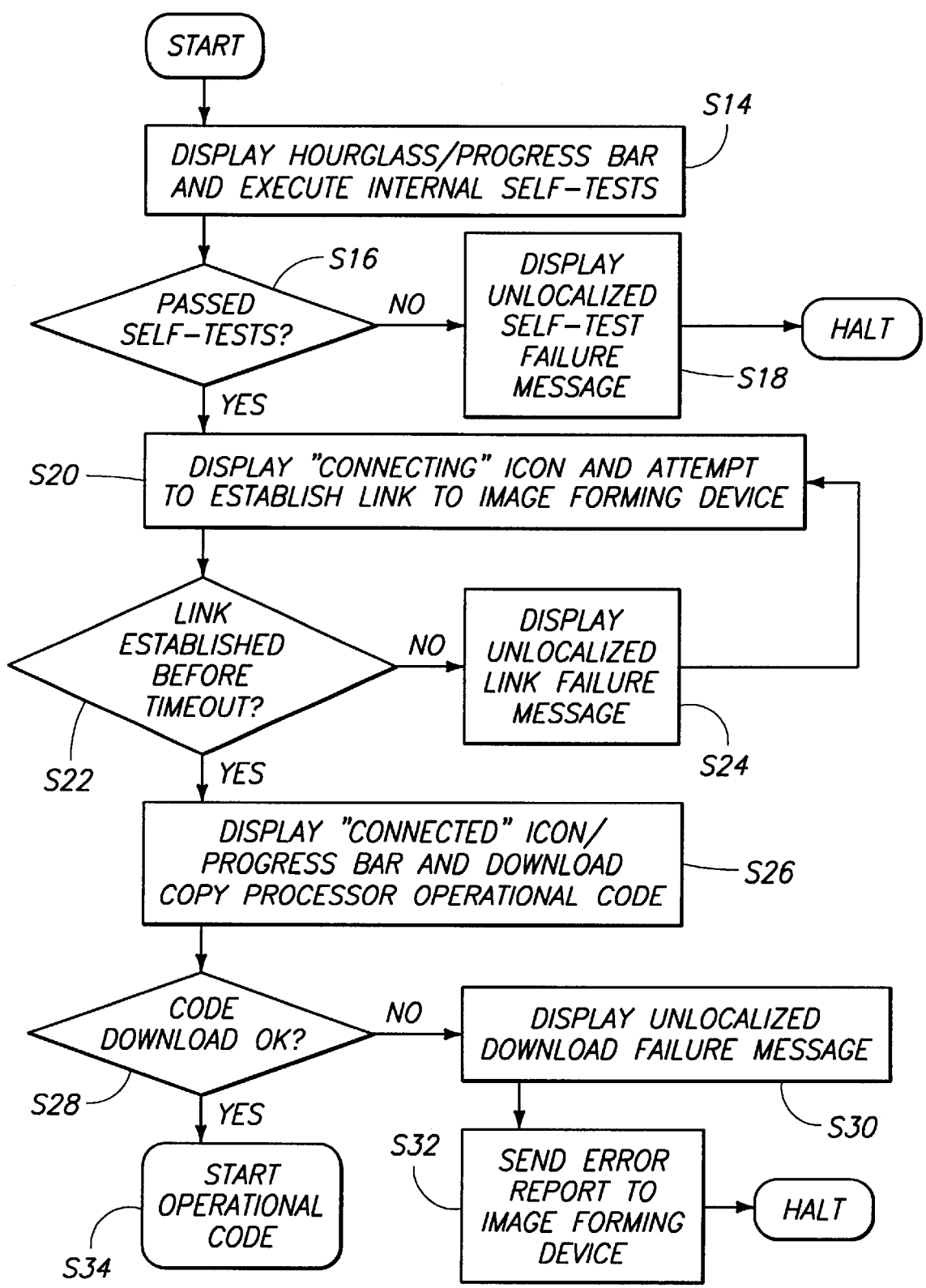

IMAGE FORMING SYSTEM AND METHOD OF OPERATING AN IMAGE FORMING SYSTEM

FIELD OF THE INVENTION

The present invention relates to an image forming system and method of operating an image forming system.

BACKGROUND OF THE INVENTION

Printers in conventional arrangements have been typically configured to interface with one or more associated computers and to generate a plurality of images responsive to control and received page description language data from such associated computers. More recently, the roles of printers have been expanded to provide more varied functions. For example, some printers have been developed to provide conventional printing operations from an associated computer while additionally providing operations normally handled by copiers.

Such printers can be coupled with one or more accessory devices to provide enhanced flexibility and an increased number of functions. Exemplary printer arrangements are configured to couple with a scanner accessory device to provide a printer system capable of typical copy functions. Scanners are configured to convert images provided upon media into electronic data or information. The converted electronic data corresponding to the images is transferred to the associated printer. Thereafter, the printer operates to reproduce the scanned images upon outputted media. Plural copies can be generated by the printer.

Often, accessory devices which interface with an associated printer individually include a dedicated microprocessor configured to control operations of the accessory device. Conventional arrangements provide code or firmware for controlling the operations of the accessory device on hardware storage devices which can comprise a read-only memory (ROM) device or an electronically erasable programmable read-only memory (EEPROM) device.

The storage device usually contains boot code for initially configuring the accessory device. Additional code configured to control operations of the accessory device during actual operation is also provided upon the hardware device. The permanent storage of the software or firmware on a storage device of the printer accessory itself has distinct disadvantages. For example, the executable code cannot be updated without replacing hardware in the case of a ROM device, or reprogramming the storage device in the case of an EEPROM device. Such replacement or reprogrammation of the appropriate storage device is difficult after the initial sale and configuration of the printer.

Further, the ROM or EEPROM devices upon the printer accessory must be large enough to hold both the boot code and other executable code to enable control operations of the printer accessory. Accordingly, larger and more expensive storage devices are often utilized.

Therefore, a need exists to provide improved printing systems and print methodologies which overcome the shortcomings of the prior art devices.

SUMMARY OF THE INVENTION

The present invention provides an image forming system and method of operating an image forming system. According to one aspect, the present invention provides an image forming system comprising: an accessory device including a processor configured to control at least one operation of the accessory device; an image forming device coupled with the accessory device and including a storage device; and wherein the storage device of the image forming device is configured to store operational data useable by the accessory device, and the image forming device is configured to output the operational data and the accessory device is configured to receive the operational data and the processor is configured to control the at least one operation of the accessory device responsive to the operational data.

A second aspect of the present invention provides an image forming system comprising: an accessory device including: a scanner configured to generate image data of an image to be reproduced; a storage device; and a processor configured to control at least one operation of the accessory device; a printer coupled with the accessory device and including: a print engine configured to print images upon media; a print engine controller configured to control the print engine responsive to the image data; a storage device; and wherein the storage device of the printer is configured to store operational data useable by the accessory device, and the printer is configured to output the operational data and the accessory device is configured to receive the operational data and store the operational data within the storage device of the accessory device, and the processor is configured to control the at least one operation of the accessory device responsive to the operational data.

Another aspect of the present invention provides a method of operating an image forming system comprising: providing an image forming device having a storage device; storing operational data using the storage device of the image forming device; coupling an accessory device with the image forming device; communicating the operational data from the storage device of the image forming device to the accessory device; and controlling at least one operation of the accessory device using the operational data.

DESCRIPTION OF THE DRAWINGS

Preferred embodiments of the invention are described below with reference to the following accompanying drawings.

FIG. 5 is a functional block diagram of hardware components of an exemplary accessory device of the printer system.

FIG. 6 is a flow chart illustrating one method for downloading operational data from the image forming device to the accessory device of the printer system.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 1:
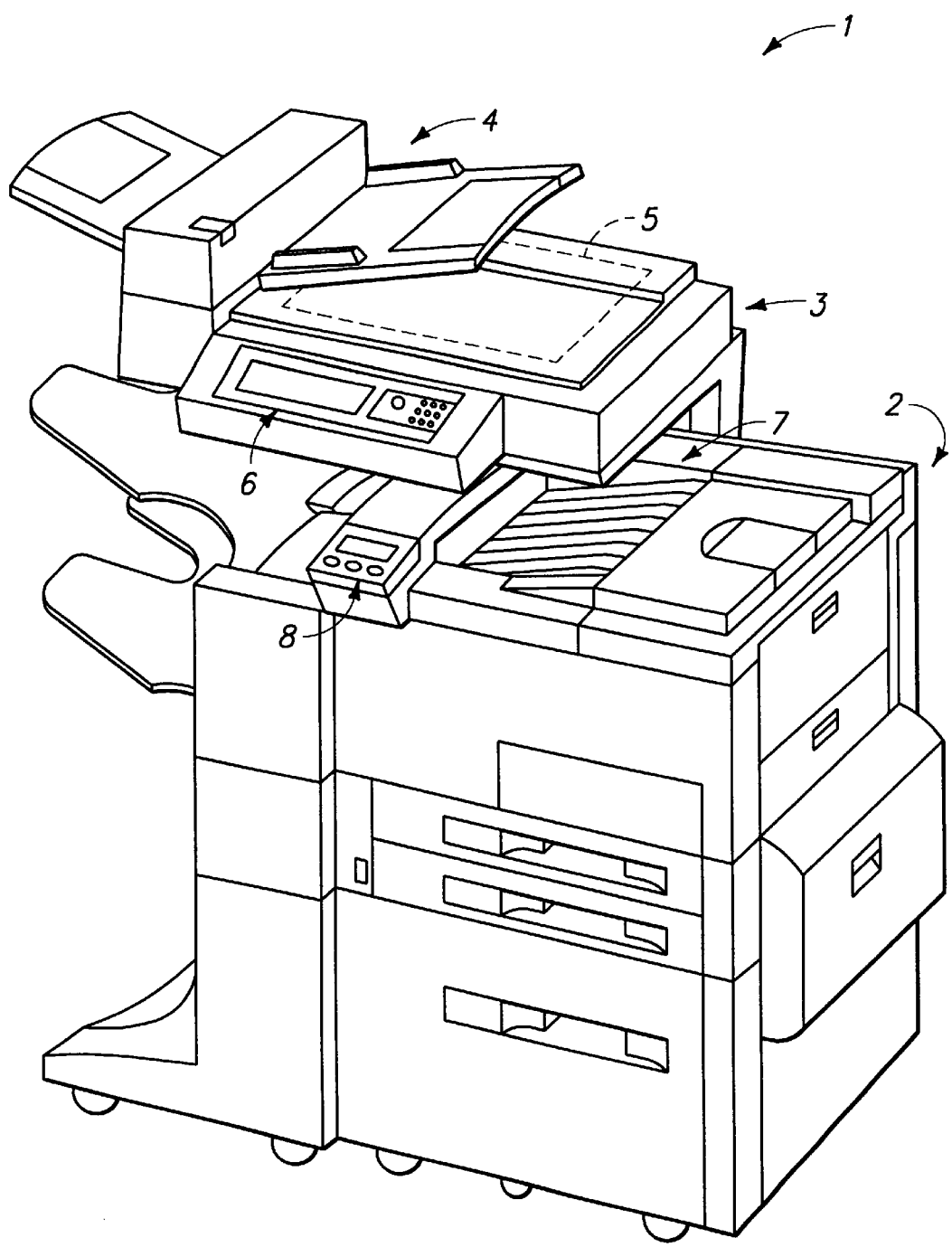
FIG. 1 is an isometric view of one printer system embodiment according to the present invention.

Referring to FIG. 1, an exemplary configuration of an image forming system 1 according to the present invention is illustrated. The depicted image forming system 1 comprises an image forming device 2 and an accessory device 3. In one configuration, image forming device 2 comprises a printer, such as a laser printer, and accessory device 3 comprises a scanner. Accordingly, accessory device 3 can be referred to as a printer accessory in the described embodiment.

In general, accessory device 3 includes an input device adapted to receive an image to be reproduced. Accessory device 3 outputs image data pertaining to the image to image forming device 2. For example, accessory device 3 can scan images from provided pages and convert the scanned images into electronic data.

The depicted accessory device 3 includes an automatic document feeder (ADF) 4 to provide automatic feeding and scanning of one or more documents. Alternatively, flatbed scanning may be provided by lifting automatic document feeder 4 and placing individual pages upon an image reception device 5, such as a flatbed window of accessory device 3. Accessory device 3 further includes a user interface 6 configured to display status information regarding operation of accessory device 3. User interface 6 is also operable to receive input from a user to control operation of accessory device 3.

An interface (not shown in FIG. 1) couples image forming device 2 and accessory device 3. Exemplary interfaces include a parallel connection, or an IEEE-1394 serial bus. Image forming device 2 includes a print engine (not shown in FIG. 1) configured to provide an image upon media which corresponds to received image data. Printed media including the images are provided to an output bin 7. The depicted image forming device 2 also includes a user interface 8 configured to display status information of image forming device 2. User interface 8 is also operable to receive commands from a user.

Figure 2:
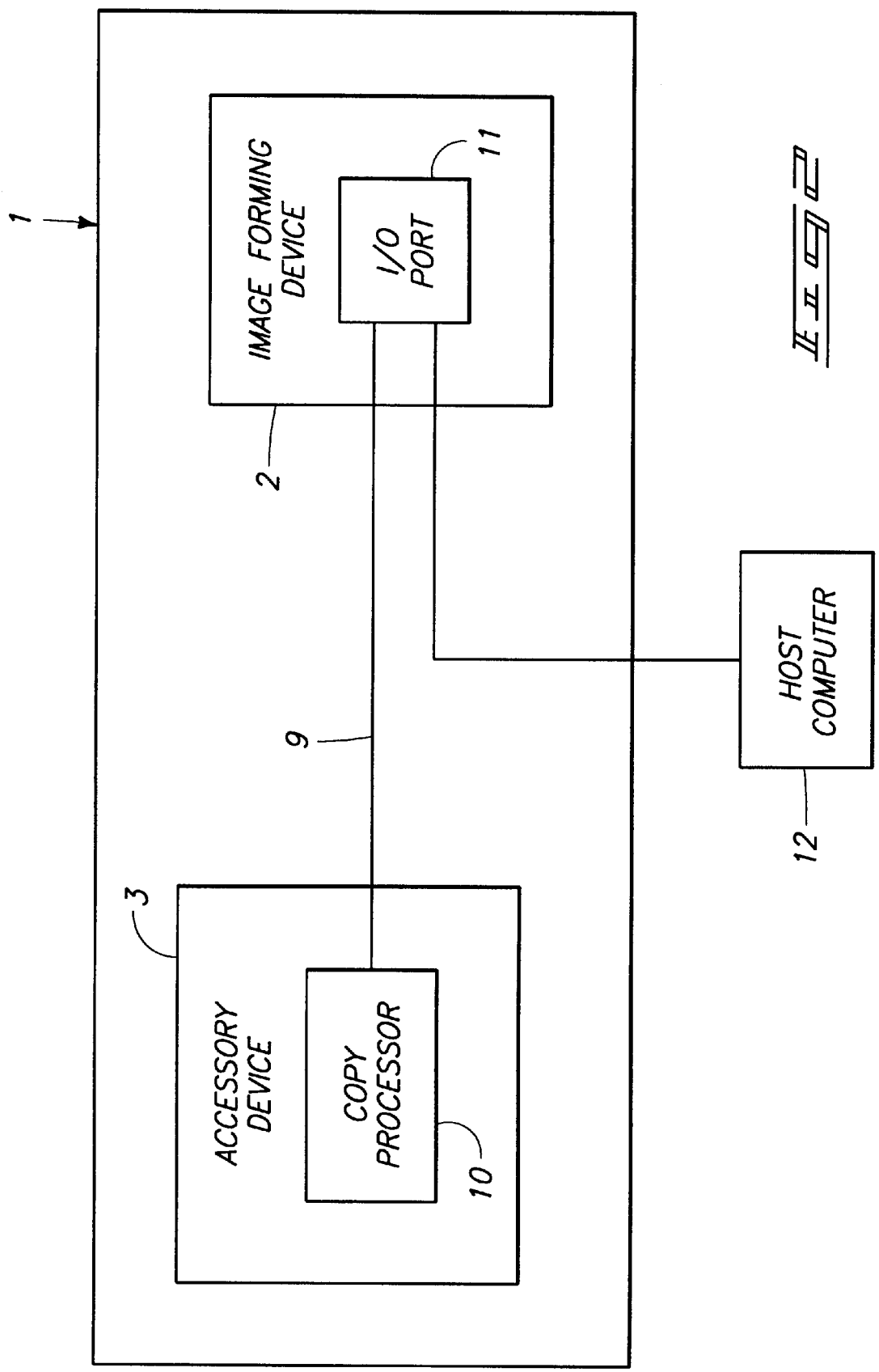
FIG. 2 is a functional block diagram of the printer system shown in FIG. 1.

Referring to FIG. 2, a high level functional block diagram of one embodiment of image forming system 1 is illustrated. Image forming system 1 includes image forming device 2 coupled with accessory device 3. An interface 9 is coupled intermediate image forming device 2 and accessory device 3. Accessory device 3 includes a copy processor 10 configured to communicate data intermediate internal components of accessory device 3 with interface 9.

FIG. 2 generally depicts communication channels intermediate various components and does not depict internal circuitry of the individual components. Image forming device 2 includes an input/output (I/O) port 11 configured to communicate data intermediate interface 9 and internal components of image forming device 2. In some embodiments, I/O port 11 is also configured to couple with an external host computer 12. Host computer 12 can be configured to communicate image data and other information to I/O port 11 of image forming device 2.

Figure 3:
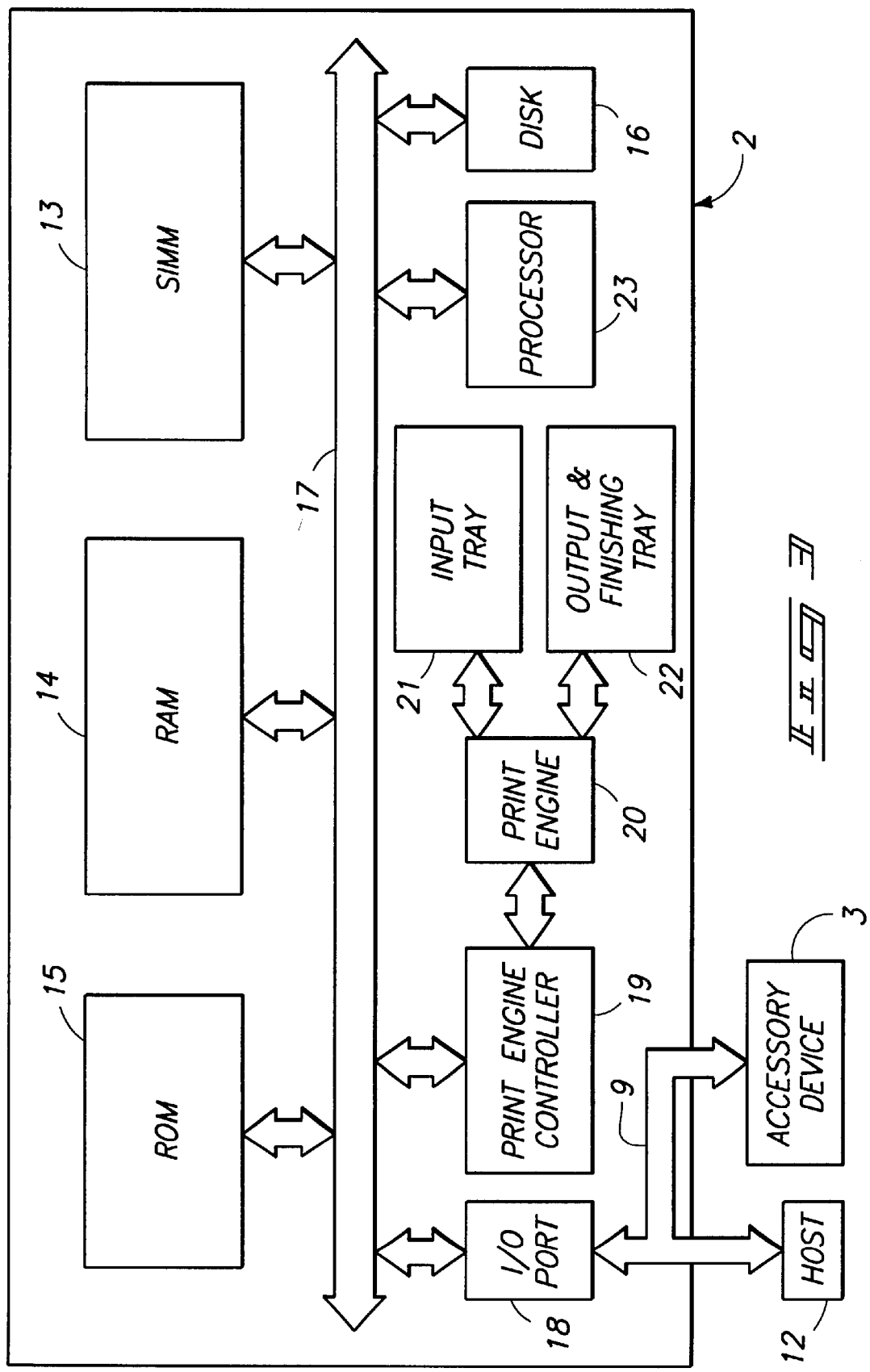
FIG. 3 is a functional block diagram of hardware components of an exemplary image forming device of the printer system.

Referring to FIG. 3, hardware of an exemplary image forming device 2 is illustrated. As referred to above, the present invention is described with reference to a printer image forming device. However, the present invention is not limited to the disclosed arrangement but is applicable to other systems including other image forming device and peripheral device configurations. Exemplary alternative image forming devices include facsimiles, copiers, and multiple function peripheral devices.

The depicted embodiment of image forming device 2 comprises a plurality of storage devices including a single-in-line-memory module (SIMM) device 13, random-access memory (RAM) device 14, read-only memory (ROM) device 15, and hard disk drive storage device 16. Storage device 13 can also comprise a dual-in-line-memory module (DIMM) in another arrangement. Individual storage devices 13, 14, 15, 16 are coupled with a bidirectional bus 17 for implementing data communications within image forming device 2.

Additional hardware of the depicted image forming device 2 includes an input/output (I/O) port 18, print engine controller 19, print engine 20, input tray 21, and output and finishing tray 22. Image forming device 2 additionally includes a processor 23, such as a microprocessor, configured to control functions of image forming device 2. Processor 23 communicates with other hardware elements of image forming device 2 via bus 17.

I/O port 18 comprises an input/output device adapted to couple with accessory device 3 and host computer 12. Host computer 12 can include a personal computer or network computer arrangement external to image forming device 2. I/O port 18 can comprise an IEEE-1394 serial interface and/or a standard 1284 parallel interface which provide communications with accessory device 3 and host computer 12. I/O port 18 receives image data from accessory device 3 and page description language (PDL) data from host computer 12 for processing within image forming device 2. Further, other data can be communicated using I/O port 18.

Print engine controller 19 and associated print engine 20 are coupled to bus 17 and provide print output capability for image forming device 2 in but one embodiment. Sheet media is pulled from input tray 21 into print engine 20 and subsequently directed to output and finishing tray 22. Output and finishing tray 22 includes, in an exemplary embodiment, finishing feature mechanisms such as sheet registration, binding, stapling, punching, and the like, and may include one or more bins for collation or "mailbox" usage purposes. Input tray 21 may also include a plurality of input trays for varied media selection.

According to the described embodiment, print engine 20 is a multi-resolution capable engine. For example, it can print, selectively, at 600 or 1200 dots per inch (dpi). For purposes of this disclosure, print engine 18 is a laser printer that employs an electrophotographic drum imaging system. Other image forming devices are utilized in other embodiments.

In general, the operation of image forming device 2 commences responsive to the reception of page description data from host computer 12 or image data from accessory device 3 via I/O port 18. The page description language data or image data is initially placed in random-access memory RAM 14. Processor 23 accesses the page description language data and/or image data, and performs operations specified by firmware.

Random-access memory 14 provides main memory storage capabilities within image forming device 2 for storing and processing print job data streams received from host computer 12 and image data from accessory device 3. Random-access memory 14 comprises dynamic random-access memory (DRAM) in an exemplary embodiment. Read-only memory (ROM) 14 contains firmware which controls the operation of processor 23 and image forming device 2.

Figure 4:
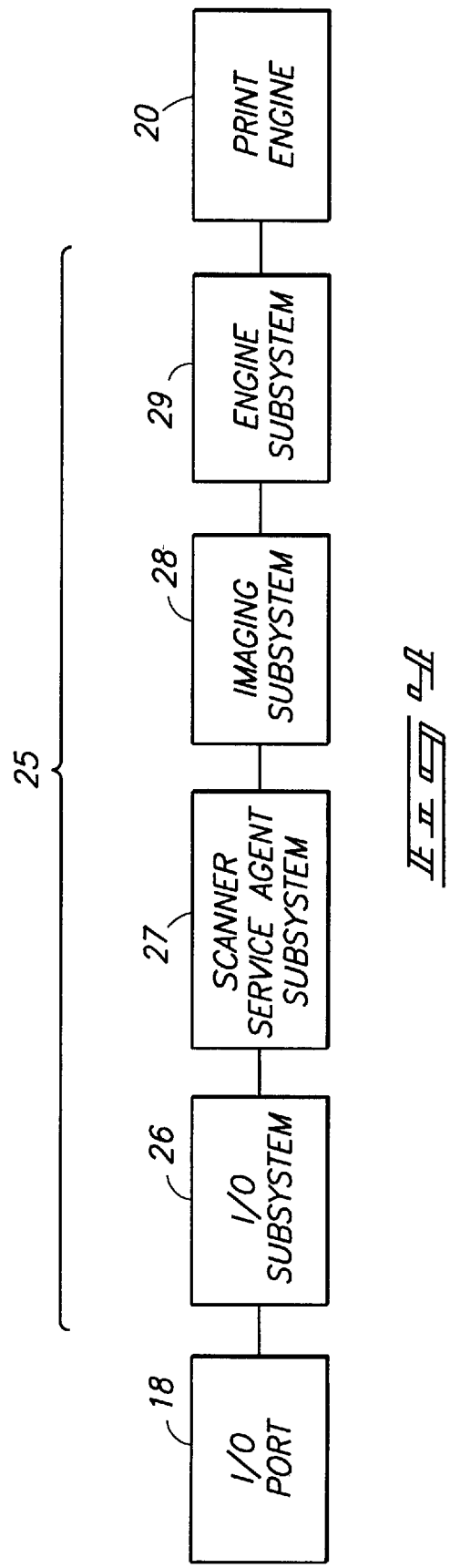
FIG. 4 is a functional block diagram of exemplary firmware subsystems of the image forming device.

Referring to FIG. 4, exemplary firmware code procedure 25 stored in ROM 15 is depicted. Firmware 25 includes an input/output (I/O) subsystem a scanner service agent (SSA) subsystem 27, an imaging subsystem 28, and an engine subsystem 29. Other configurations of image forming device 2 are possible.

I/O subsystem 26 is operable to accept inbound data received from I/O port 18 and prepare outbound data for communication via I/O port 18. I/O subsystem 26 is configured to strip I/O specific data from the received data and provide the remaining data (e.g., image data, page description language) into a buffer.

Scanner service agent subsystem 27 is configured to retrieve the received data from the buffer and apply selected data to imaging subsystem 34 for further processing. Scanner service agent subsystem 27 analyzes and interprets the incoming data (e.g., image data, page description language data, command data, etc.).

Scanner service agent subsystem 27 can provide specific job and printer status information to copy processor 10 and manage a peripheral management language (PML) interface intermediate image forming device 2 and accessory device 3. Copy processor 10 of accessory device 3 preferably receives PML code from image forming device 2 during a boot cycle as described in detail below. Downloading appropriate code to copy processor 10 enables interfacing of accessory device 3 and image forming device 2.

Scanner service agent subsystem 27 processes command data and selectively replies to accessory device 3 responsive to the particular command. Scanner service agent subsystem 27 manages file system interface between image forming device 2 and accessory device 3.

Scanner service agent subsystem 27 is operable to forward print data comprising image data or page description language data to imaging subsystem 28 for further processing. Scanner service agent subsystem 27 is further operable to format image data received from accessory device 3 for the appropriate page description language or personality of image forming device 2.

Imaging subsystem 28 contains a parser and rasterizer configured to respectively parse and rasterize a data stream to be printed. In particular, imaging subsystem 28 is configured in the described configuration to generate a display command list. Individual display commands define an object to be printed on a page. Imaging subsystem 28 includes rasterizer firmware configured to convert individual display commands to an appropriate bit map (rasterized strip) and distribute the bit map into RAM 14. Compression firmware may be provided to compress the rasterized strips in the event insufficient memory exists in RAM 14 for holding the rasterized strips.

The rasterized data may be retrieved from RAM storage device 14 by engine subsystem 29. Engine subsystem 29 interfaces with print engine 20 to provide the rasterized data upon the media. Rasterized strips of data are passed to print engine 20 by print engine controller 19 thereby enabling the generation of an image (i.e., text, graphics, etc.) when a page is closed for processing (i.e., all strips have been evaluated, rasterized, compressed, etc.). Engine subsystem 29 controls the sequencing and transferring of page strips to print engine controller 19. Engine subsystem 29 additionally controls the operation of print engine controller 19 and print engine 20.

Referring to FIG. 5, hardware of an exemplary accessory device 3 is illustrated. The depicted accessory device 3 includes a copy processor 10 coupled with a scanner 30. Copy processor 10 resides within a slot of scanner 30 in an alternative embodiment. Other arrangements of accessory device 3 are possible.

Copy processor 10 may be configured to provide the following functionality including: image processing, interfacing with image forming device 2, interfacing with and controlling scanner 30, operating user interface 6 of accessory device 3, and mapping user settings to configuration data appropriate for internal processing of scanned images. Copy processor 10 is also operable to provide loading of operational data (also referred to as runtime data) from image forming device 2 to accessory device 3 in accordance with configuration methodologies of the present invention. Such loading of operational data is described in detail below.

The depicted copy processor 10 includes an internal processor 32. One configuration of processor 32 comprises a 16-bit microprocessor having part designation 68306 available from Motorola, Inc. The depicted copy processor 10 also comprises a read-only memory device 34, a dynamic random-access memory (DRAM) storage device 36, plural digital signal processors (DSPs) 38, 39, plural static random-access memory (SRAM) storage devices 40, 41, and an I/O port 42.

During power-up, microprocessor 32 boots using boot process firmware stored within read-only memory storage device 34. Thereafter, processor 32 runs through start-up diagnostics and attempts to communicate with scanner 30 and image forming device 2 coupled with I/O port 42. Copy processor 10 obtains its operational code from image forming device 2. In particular, upon achieving successful communication with image forming device 2, operational or runtime data (including executable code for processor 32) is downloaded from image forming device 2 into DRAM storage device 36 in accordance with the present invention. If during power-up, accessory device 3 fails to detect an attached image forming device 2, copy processor 10 remains idle and periodically polls to monitor for attachment of image forming device 2. Following successful downloading of operational data, copy processor 10 completes its diagnostics and is thereafter in a ready state of operation.

During operation, a user can input commands via user interface 6 shown in FIG. 1. User inputted commands are received by copy processor 10. Scanner 30 is configured to scan provided images utilizing an internal scanner engine (not shown). Scanner 30 outputs image data corresponding to the received images to copy processor 10.

Communications intermediate accessory device 3 and scanner 30 include a scanner control channel and an image data bus. Copy processor 10 can be connected to internal electronics of scanner 30 via an internal EX slot of scanner 30. In the preferred embodiment, copy processor 10 acts as the master of communications with scanner 30 and thus, no unsolicited data flows from, scanner 30 to copy processor 10. An exemplary control channel intermediate processor 32 and scanner 30 comprises a half-duplex asynchronous serial bus at TTL-levels. A scanner image bus coupled intermediate scanner 30 and first digital signal processor. 38 comprises a uni-directional 8-bit parallel link providing communications at 10 MHZ in accordance with the described embodiment.

Processor 32 preferably controls user interface displays within scanner 30 and also monitors user inputs provided into scanner 30. Processor 32 can include plural embedded peripherals including a DRAM controller, timers and UARTs for scanner communication and debug. Digital signal processors 38, 39 are configured to transfer image data intermediate scanner 30 and interface 9 for application to image forming device 2. Such enables processor 32 to control user interface 6 and PJL and PCL control sequences utilized to provide image transfers from accessory device 3 to image forming device 2.

Image data is forwarded from scanner 30 into plural digital signal processors 38, 39. In one embodiment, digital signal processors 38, 39 individually comprise a part designation PM-44 DSP available from Pixel Magic, Inc. Digital signal processors 38, 39 are operable to provide a plurality of processing functions for received image data from scanner 30. For example, digital signal processors 38, 39 can be configured for functions including background removal, filtering, clipping, scaling, block rotation, resolution enhancement, sideband conversion, etc.

Individual SRAM storage devices 40, 41 are dedicated to respective digital signal processors 38, 39 and are available to temporarily store image data during the processing of the data. The processed image data is forwarded to I/O port 42 for application to image forming device 2. In particular, image data may be applied to interface 9 for application to image forming device 2 with PJL and PCL commands implemented by processor 32.

Preferably, image forming device 2 contains appropriate memory to store the transferred image data. Image data is stored within RAM 14 in the described configuration. Image data may be applied to image forming device 2 via interface 9 on a line-by-line basis as soon as processing is completed within digital signal processors 38, 39.

Interface 9 is configured to provide additional communications intermediate image forming device 2 and accessory device 3. For example, printer status responses and user settings programmed via user interface 8 of image forming device 2 may be applied to copy processor 10 via interface 9. Likewise, user settings inputted via user interface 6 of accessory device 3 may be applied to image forming device 2 via interface 9. Printer control commands can be outputted via copy processor 10 and applied to interface 9 and image forming device 2. In the preferred arrangement, copy processor 10 is typically the master of the communications with image forming device 2.

Operational or runtime data is outputted from image forming device 2 to accessory device 3 in accordance with the present invention. More specifically, upon power-up of accessory device 3, processor 32 boots itself from ROM storage device 34. Thereafter, processor 32 initiates a transfer requesting the remainder of the operational data including code from image forming device 2. Operational data is stored within image forming device 2 in the preferred embodiment.

In particular, operational data is stored upon hard disk drive 16 of image forming device 2 and is downloaded via interface 9 to DRAM storage device 36. The operational data can include firmware comprising code for operating accessory device 3, configuration parameters including microcode for digital signal processors 38, 39, and display information utilized to form screens for user interface 6. The operational or runtime data which is downloaded can comprise more or less data or code.

Following completion of the transfer of operational data from image forming device 2 into DRAM 36 of accessory device 3, processor 32 executes the received operational data from DRAM 36. Such provides the benefits of facilitating updates or modification of operational data or code utilized for operations of accessory device 3. Modified operational data including updates to the accessory device firmware can be implemented by downloading a new file to hard disk drive 16 or other storage device of image forming device 2. The downloading can be implemented using host computer 12 comprising a personal computer, network, etc. in an exemplary embodiment.

Referring to FIG. 6, the depicted flow chart illustrates one exemplary process for booting accessory device 3 and downloading operational or runtime data from image forming device 2 to accessory device 3. Following the application of power to accessory device 3, boot code is executed from ROM storage device 34 by processor 32. The boot code can be configured to implement the following steps.

Processor 32 initially proceeds to step S14 where an hourglass/progress bar is displayed via user interface 6 and an internal self-test of accessory device 3 is conducted. At step S16, it is determined whether the self-tests were passed. If the self-tests were not passed as determined at step S16, processor 32 proceeds to step S18 to display an unlocalized self-test failure message. Thereafter, processor 32 proceeds to a halt condition. Alternatively, if at step S16, the self-tests were passed, processor 32 proceeds to step S20 and displays a "connecting" icon/progress bar via user interface 6 and attempts to establish a link with image forming device 2.

At step S22, it is determined whether a link is established with image forming device 2 before a specified timeout expires. Processor 32 proceeds to step S24 if no link is established prior to the timeout wherein an unlocalized link failure message is displayed. Thereafter, processor 32 returns to step S20 in an attempt to establish a link with image forming device 2. If a link is established at step S22, processor 32 proceeds to step S26 and displays a "connected" icon/progress bar via user interface 6 and downloads and copies operational or runtime data from image forming device 2 into accessory device 3 in accordance with the present invention.

At step S28, it is determined whether the operational data was satisfactorily downloaded. If the data was not downloaded in a satisfactory manner, processor 32 proceeds to step S30 and displays an unlocalized download failure message via user interface 6. Thereafter, an error report is sent to image forming device 2 at step S32 and processor 32 enters an idle state. Alternatively, if the operational data was determined to be completely downloaded at step S28, processor 32 proceeds to step S34 to begin executing the downloaded operational or runtime data.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An image forming system comprising:
    an accessory device including a processor configured to control at least one operation of the accessory device;
    an image forming device coupled with the accessory device and including a storage device; and
    wherein the storage device of the image forming device is configured to store operational data usable by the accessory device, and the image forming device is configured to output the operational data and the accessory device is configured to receive the operational data, and the processor is configured to control the at least one operation of the accessory device responsive to the operational data.

2. The image forming system according to claim 1 wherein the accessory device is configured to request the operational data from the image forming device.

3. The image forming system according to claim 1 wherein the image forming device includes an interface configured to receive modified operational data.

4. The image forming system according to claim 1 wherein the operational data comprises at least one of executable code and plural configuration parameters.

5. The image forming system according to claim 1 wherein the accessory device comprises a scanner and the image forming device comprises a printer.

6. The image forming system according to claim 1 wherein the accessory device comprises an input device adapted to receive an image to be reproduced and to output image data pertaining to the image to the image forming device.

7. The image forming system according to claim 1 wherein the accessory device includes:
   a first storage device configured to store boot code; and
   a second storage device configured to store the operational data.

8. The image forming system according to claim 7 wherein the boot code instructs the processor to request the operational data from the image forming device.

9. The image forming system according to claim 1 wherein the operational data comprises firmware.

10. An image forming system comprising:
    an accessory device including:
      a scanner configured to generate image data of an image to be reproduced;
      a storage device; and
      a processor configured to control at least one operation of the accessory device;
    a printer coupled with the accessory device and including:
      a print engine configured to print images upon media;
      a print engine controller configured to control the print engine responsive to the image data;
      a storage device; and
    wherein the storage device of the printer is configured to store operational data comprising executable code usable by the accessory device, and the printer is configured to output the operational data and the accessory device is configured to receive the operational data and store the operational data within the storage device of the accessory device, and the processor is configured to control the at least one operation of the accessory device responsive to the operational data.

11. A method of operating an image forming system comprising:
    providing an image forming device having a storage device;
    storing operational data using the storage device of the image forming device;
    coupling an accessory device with the image forming device;
    communicating the operational data from the storage device of the image forming device to the accessory device; and
    controlling at least one operation of the accessory device using the operational data.

12. The method according to claim 11 further comprising forwarding image data from the accessory device to the image forming device.

13. The method according to claim 11 wherein the providing comprises providing a printer and the coupling comprises coupling a scanner with the printer.

14. The method according to claim 11 further comprising:
    storing modified operational data within the storage device of the image forming device; and
    communicating the modified operational data from the storage device to the accessory device.

15. The method according to claim 11 further comprising:
    requesting the operational data using the accessory device and the communicating being responsive to the requesting.

16. The method according to claim 11 further comprising:
    storing boot code within a first storage device of the accessory device; and
    storing the operational data within a second storage device of the accessory device.

17. The method according to claim 16 further comprising booting the accessory device using the boot code.

18. The method according to claim 11 wherein the storing comprises storing at least one of executable code and plural configuration parameters.

19. The method according to claim 11 wherein the storing comprises storing firmware.

20. The method according to claim 11 further comprising processing the operational data and the controlling being responsive to the processing.

21. The image forming system according to claim 1 wherein the operational data comprises executable code.

22. The image forming system according to claim 21 wherein the accessory device is configured to provide image data pertaining to an image and the image forming device comprises a printer.

23. The image forming system according to claim 1 wherein the image forming device is configured to physically render an image upon media responsive to image data from the accessory device.

24. The method according to claim 20 wherein the processing and the controlling comprise processing and controlling using processing circuitry of the accessory device.

* * * * *